June 6, 1950 A. FRUM 2,510,097

AUTOMATIC VOLUME CONTROL SYSTEM

Filed March 8, 1947

INVENTOR.
ALEXANDER FRUM

BY Robert Harding Jr.

ATTORNEY

Patented June 6, 1950 2,510,097

UNITED STATES PATENT OFFICE 2,510,097

AUTOMATIC VOLUME CONTROL SYSTEM

Alexander Frum, New York, N. Y., assignor to International Standard Electric Corporation, New York, N. Y., a corporation of Delaware Application March 8, 1947, Serial No. 733,403

5 Claims. (Cl. 343—109)

This invention relates to receivers and more particularly to automatic volume control systems for arrangements requiring a plurality of receivers.

In systems wherein more than one signal from different transmitters are to be received, it is generally required that separate receivers be provided if automatic volume control is to be applied. This is particularly the case where the received signals differ considerably in amplitude at the receiving point, as in the case of localizer and glide path beacons.

It is an object of my invention to provide an improved automatic volume control for use with a receiver of signals from a plurality of sources.

In a particular embodiment to be more fully described later, there is provided a single automatic volume control system for use with radio beacon receivers of the type in which localizer and glide path signals are alternately transmitted, the signals being distinguished by different modulation characteristics.

Figure 1:
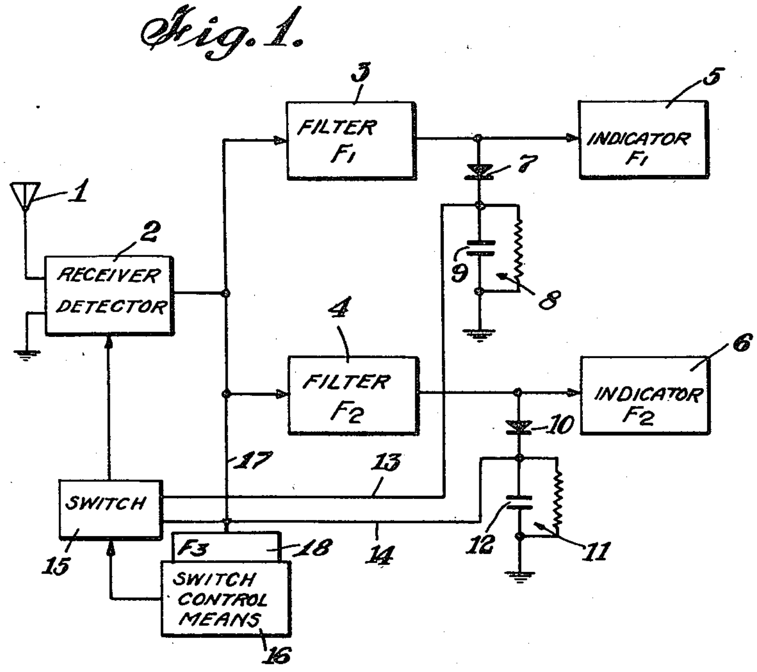
Figure 2:
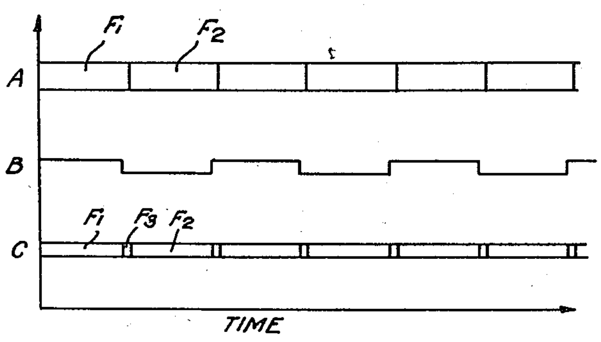

The above mentioned and other features and objects of this invention will become more apparent, and the invention itself, though not necessarily defined by the said feature and objects, will be best understood by reference to the following description of an embodiment of the invention taken in connection with the accompanying drawings wherein:

Fig. 1 illustrates in block diagram form, the application of a single automatic volume control system to a pair of receiving systems and Fig. 2 illustrates in graphic form switch timing cycles utilized in the present invention.

Referring to Fig. 1, beacon signals comprising modulation characteristics are received on antenna 1 and detected in receiver detector 2 to reproduce the modulation envelope. The signals, for example may be as graphically indicated in Fig. 2 at A wherein signal F1 designates the localizer transmission period and F2 designates the frequency of the period during which the glide path signals are transmitted. These signals may be distinguished by a given characteristic, frequency for example. After detection in detector 2 of Fig. 1 the signals are applied through separate signal separating discriminators 3 and 4 which may be filters which serve to apply the energy from the localizer beacon and the glide path beacon to the individual indicators 5 and 6 respectively. In the output of filter 3 there is provided a rectifier 7 and automatic volume control time constant circuit 8 which provides a charge in the condenser 9 proportional to the localizer signal. Similarly, in the output of glide path filter 4 there is provided a rectifier 10, and time constant circuit 11 which serves to provide a volume control charge across condenser 12 proportional to the glide path signal. The voltages across 8 and 11 respectively, are applied over lines 13 and 14, to automatic volume control switch 15 and from there to receiver-detector 2.

The switch 15 is operated to apply, alternately, energy incoming over lines 13 and 14 to receiver 2 so that the proper volume control bias will be applied to the receiver to correspond with the received beacon signals. Operation of switch 15 into its effective positions is produced by switch control means 16 which is synchronized with the changes in frequency by energy incoming over line 17. Preferably, switch control means 16 should operate switch 15 so as to apply the next succeeding volume control bias just prior to the receipt of the signal.

In Fig. 2, there is shown at B the time control switching energy which is illustrated as occurring immediately prior to the commencement of each of the periods F1 and F2. Switch control means, for example, 16, Fig. 1 may be a multivibrator with a proper time constant which is synchronized by the changes in signals received from the output of receiver 2 over line 17. This may be, for example, similar to the trigger circuits described in "Ultra High Frequency Techniques" by Brainerd, Koeler, Reich and Woodruff (published by D. Van Nostrand Co. Inc. in 1942, page 171 et sequa, section 4–4 and page 176 et sequa, section 4–5. The change from frequency F1 to frequency F2 for instance may provide the synchronizing control.

Instead of transmitting only glide path and localizer signals from the beacons a special switch synchronizing signal may be transmitted intermediate each of the transmissions F1 and F2 as shown at C of Fig. 2. This special synchronizing signal may be of a still different characteristic, such as frequency F3, if desired. When such a signal is to be received the switch control means 16 of Fig. 1 will include a suitable filter for selecting the marker or switching signal F3, to synchronize the operation of the multivibrator or other switch control means, instead of depending upon frequency change.

It will be understood that while I have described my invention particularly with signals distinguished in frequency any other characteristic may be used. For example pulse signals of different characteristic may be used, in which case the signal discriminators are so chosen as to separate these signals according to their characteristics.

Since the glide path and localizer signals are emitted non-simultaneously, they need not, in principle, be distinguished further by audio modulations, but could also be transmitted unmodulated and separated in the receiver on a time sequence basis, employing the well known technical means of time division multiplexing.

The carrier frequency of the signals may be the same, or may be slightly different, it being understood that the receiver detector has sufficient band width to handle such signals.

While I have described above the principle of my invention in connection with specific apparatus and particular modifications thereof, it is clearly understood that this description is made only by way of example and not as a limitation of the scope of my invention.

I claim:

1. In a signalling system wherein a plurality of electrical signals having different characteristics are alternately transmitted, means for receiving said signals, means for detecting the output of said receiver to obtain energy of said characteristics, means for selectively applying energy of each of said characteristics to separate indicators, means for applying energy of each of said characteristics to separate time constant circuits whereby a charge proportional to the energy of each of said characteristics is stored, switching means having means for synchronizing the operation thereof with the output of said receiver for applying said stored charges to said receiver whereby functions of said receiver are controlled during the period of reception of signals of corresponding characteristics.

2. In a radio navigation system wherein a plurality of electrical signals having different characteristics are alternately transmitted, means for receiving said signals, means for detecting the output of said receiver to obtain energy of said characteristics, means for selectively applying energy of each of said characteristics to separate indicators, means for applying energy of each of said characteristics through separate rectifiers to separate time constant circuits whereby a charge proportional to the energy of each of said characteristics is produced, switching means for alternately applying said charges to said receiver, and means controlled by the output of said receiver for synchronizing said switching means.

3. In a radio navigation system wherein a plurality of electrical signals having different characteristics are alternately transmitted, means for receiving said signals, means for detecting the output of said receiver to obtain energy of said characteristics, means for selectively applying energy of said characteristic to separate indicators, means for applying energy of each of said characteristics through separate rectifiers to separate time constant circuits whereby a stored charge proportional to the amplitude of the energy of each of said characteristics is produced, switching means for alternately applying each of said stored charges to said receiver whereby the proper volume control bias will be applied to said receiver to correspond with the received signal comprising switching means, and means controlled by the output of said receiver for synchronizing said switching means.

4. In a radio navigation system wherein localizer and glide path characteristic signals are alternately transmitted, means for receiving said signals comprising a receiver, filter circuits and indicator circuits, means for separating said received signals in accordance with their characteristics comprising said filter circuits, means for applying said separated signals to time constant circuits whereby a control signal proportional to each of the energy of said characteristic signals is stored, switching means synchronized with said received signals for alternately applying said stored signals to said receiver whereby the proper control bias will be applied to the receiver to correspond with the respective received characteristic signals.

5. In a radio navigation system wherein localizer and glide path characteristic signals are alternately transmitted, means for receiving said signals comprising a receiver, separate filter circuits and separate indicator circuit for said localizer and glide path signals, means for applying the output of said receiver to said localizer and glide path filter circuits whereby said characteristic signals are separated, means for applying said characteristic signals to separate indicators, means for applying the output of said separate filter circuit through separate rectifier circuits to separate time constant circuits whereby separate volume control signals proportional to said localizer and glide path received signals are stored, means for alternately applying said stored signals to said receiver whereby the proper volume control bias will be applied to the receiver to correspond with respective localizer or glide path received beacon signals comprising switching means, means for controlling said switching means comprising control means, said control means being synchronized with said received signals.

ALEXANDER FRUM.

REFERENCES CITED

The following references are of record in the file of this patent:

UNITED STATES PATENTS

| Number | Name | Date |
|---|---|---|
| 2,051,966 | Runge | Aug. 25, 1936 |
| 2,086,229 | Kotowski | July 6, 1937 |
| 2,383,126 | Hollingsworth | Aug. 21, 1945 |
| 2,393,921 | Mason | Jan. 29, 1946 |
| 2,422,334 | Bedford | June 17, 1947 |